United States Patent [19]

Holzer et al.

[11] Patent Number: 5,030,686

[45] Date of Patent: Jul. 9, 1991

[54] TRANSPARENT COVER LAYER FOR TRANSPARENT GLASS OR PLASTIC SUBSTRATE

[75] Inventors: Gerhard Holzer; Udo Gelderie, both of Aachen; Cornelia Breuer, Aldenhoven, all of Fed. Rep. of Germany

[73] Assignee: Isover Saint-Gobain, Courbevoie, France

[21] Appl. No.: 358,172

[22] Filed: May 30, 1989

[30] Foreign Application Priority Data

May 27, 1988 [DE]. Fed. Rep. of Germany ....... 3817953

[51] Int. Cl.$^5$ ............................................. C08K 5/24
[52] U.S. Cl. ................................... 524/731; 528/26.5; 528/27; 528/28
[58] Field of Search .......................... 528/26.5, 27, 28; 524/731

[56] References Cited

U.S. PATENT DOCUMENTS 4,826,914  5/1989  Raedisch et al. ..................... 528/28

Primary Examiner—Melvyn I. Marquis
Attorney, Agent, or Firm—Oblon, Spivak, McClelland, Maier & Neustadt

[57] ABSTRACT

A condensation-inhibiting transparent cover layer of soft elastic polyurethane for viewing windows or other transparent glass or plastic substrates. The reaction mixture for production of the cover layer contains, in addition to a trifunctional polyisocyanate and a trifunctional polyol, a difunctional sulfonated polyether polyol, i.e. one containing sulfonate groups, and a non-ionic tenside in the form of an ethoxylated fatty alcohol and/or an ethoxylated fatty amine.

8 Claims, No Drawings

TRANSPARENT COVER LAYER FOR TRANSPARENT GLASS OR PLASTIC SUBSTRATE

BACKGROUND OF THE INVENTION

1. Field of the Invention

The invention pertains to a transparent cover layer of soft elastic polyurethane for viewing windows or other transparent glass or plastic substrates, with a condensation-inhibiting effect.

2. Background of the Prior Art

Transparent soft elastic cover layers with a condensation-inhibiting effect are the object of the German patent application P 37 04 294. On the one hand, they have the property of undergoing plastic deformation, which returns to the original state after a short period of time, under the usual type of stress, which would result in surface deformations and scratches in harder plastics. On the other hand, they have the advantage of demonstrating a marked condensation-inhibiting effect. The condensation-inhibiting effect is based on a synergistic effect of sulfonated polyether polyol, i.e. polyether polyol containing sulfonate groups, and a non-ionic polyether polysiloxane which as present as the same time, to which the reaction mixture which forms polyurethane is added.

The condensation-inhibiting effect of these known cover layers is absolutely satisfactory at average temperatures. At temperatures below +10 degrees Celsius and after extended contact with water, however, the condensation-inhibiting effect is not completely satisfactory at higher requirements.

SUMMARY OF THE INVENTION

The invention further improves the condensation-inhibiting effect of the known cover layers, so that they demonstrate the desired effect essentially without reduction also at temperatures below +10 degrees Celsius and after extended contact with water.

In accordance with the invention, this task is accomplished in that the reaction mixture for formation of the cover layer contains the following components:

(a) a trifunctional aliphatic polyisocyanate of 1,6-hexamethylene diisocyanate with a biuret or isocyanurate structure with a content of NCO groups of 12.6 to 28% by weight, corresponding to an average molecular weight of approximately 1000 to approximately 450 g/mol;

(b) a trifunctional polyol prepared from trimethylolpropane and propylene oxide with a content of OH groups of 5.1 to 12.8% by weight, corresponding to an average molecular weight of approximately 1000 to approximately 400 g/mol, or a trifunctional polycaprolactone with a content of OH groups of 5.1 to 17% by weight, corresponding to an average molecular weight of 1000 to 300 g/mol;

(c) a difunctional sulfonated polyoxyalkylene ether, i.e. one containing sulfonate groups, of 1,2- or 1,3-diolene with a content of OH groups of 0.5 to 13.2% by weight, corresponding to an average molecular weight of approximately 6500 to approximately 250 g/mol, with the formula R-CH$_2$I—(C$_2$H$_4$O—)$_n$-(C$_3$H$_6$O—)$_m$-CH$_2$CH$_2$CH$_2$—SO$_3$X where

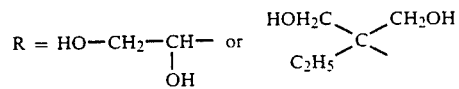

X=H—, sodium or ammonium ion,
n=0 to 100,
m=0 to 30,
n+m≧1;

(d) non-ionic copolymer of dimethyl polysiloxane (dimethyl siloxane/monomethyl polyether siloxane copolymer) modified with polyoxyalkylene in the side chain, with an average molecular weight of approximately 500–2000 g/mol, with the general formula

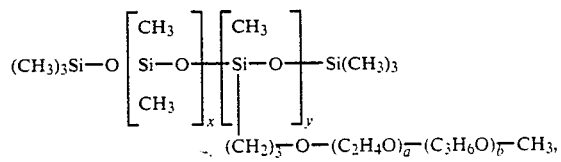

where the ratio x/y=5/1 to 1/1,
a=80–100% by weight, and
b=20–0% by weight, and (e) at least one non-ionic tenside in the form of an ethoxylated fatty alcohol and/or an ethoxylated fatty amine.

The amounts of the components forming the isocyanate component of the reaction mixture and the components forming the polyol component are to be selected in such a way that the ratio of NCO groups to OH groups is 1.0 to 2.5. Preferably, the stated components of the reaction mixture are used in the following proportional amounts: trifunctional isocyanate 36 to 50% by weight, trifunctional polyol 42.5 to 18.7% by weight, difunctional sulfonated polyoxyalkylene ether, i.e. containing sulfonate groups, 4.8 to 5.5% by weight, and non-ionic copolymer 3.8 to 4.8% by weight.

DETAILED DESCRIPTION OF THE INVENTION

It has been shown that with the composition of the reaction mixture according to the invention that in particular, the aging resistance of the cover layer is increased. It was particularly observed that the condensation-inhibiting effect is maintained for a longer period of time after the cover layer has been stored in water. Even if the condensation-inhibiting effect has been temporarily reduced after extended storage of the cover layer in water, at temperatures below +10 degrees C., the cover layer regenerates completely if it is stored at room temperature for some time, so that the original condensation-inhibiting effect is completely developed again. Even in the nonaged state, the cover layer according to the invention offers advantages as compared with the cover layer mentioned initially, in that it is less sensitive to deviations in the composition of the reaction mixture and in the polymerization conditions.

As non-ionic tensides in the form of ethoxylated fatty alcohols, with a content of OH groups of 2.4 to 4.9% by weight, corresponding to an average molecular weight of 700 to 350 g/mol, with the formula CH$_3$-(CH$_2$)$_n$—O-(C$_2$H$_4$O)$_m$—H are particularly good possibilities, where n=10 to 16 and m=4 to 10. Especially good results are achieved with an ethoxylated fatty alcohol of this composition with an average molecular weight of approximately 480 g/mol, corresponding to a content of OH groups of about 3.5% by weight; in this case, n=13 and m=6 in the chemical formula stated.

As non-ionic tensides in the form of ethoxylated fatty amines, with a content of OH groups of 2.2 to 6.5% by weight, corresponding to an average molecular eight of 1600 to 520 g/mol, those of the formula

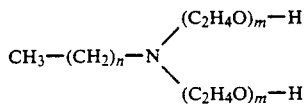

are particularly good possibilities, where n=10 to 16 and m=4 to 5. An ethoxylated fatty amine of this composition with an average molecular weight of approximately 1000 g/mol, corresponding to a content of OH groups of about 3.4% by weight, is preferred; in this case, n=13 and m=9.

The proportion of the non-ionic tenside in the reaction mixture is preferably between 8.3 and 15.5% by weight in the case of the ethoxylated fatty alcohol and preferably between 11.0 and 18.5% by weight in the case of the ethoxylated fatty amine.

Possible difunctional sulfonated polyether polyols, i.e. those containing sulfonate groups, are preferably polyether-1,3-diols with an average molecular weight of approximately 1300 g/mol. Such polyether polyols and methods for their production are described in greater detail in DE-PS 34 07 563.

In order to improve the mechanical properties of the soft elastic polyurethane cover layers, one can add a difunctional isocyanate urea adduct on the basis of isophorondiisocyanate to the reaction mixture, in addition, specifically in the amount of 4.0 to 18.7% by weight relative to the reaction mixture.

In the same way, in order to improve the mechanical properties, a difunctional polyester polyol with a content of OH groups of 2 to 5% by weight, corresponding to an average molecular weight of 1700 to 680 g/mol can be added, to the reaction mixture, in the amount of 2.8 to 8.0% by weight relative to the reaction mixture, possibly in addition to the difunctional isocyanate urea adduct.

For an evaluation of the mechanical/physical properties of the soft elastic polyurethane cover layers, the modulus of elasticity, the abrasion resistance and the microsclerometric hardness were determined as characteristic properties; in total, these permit a statement as to whether or not the cover layer demonstrates the necessary self-healing properties and the necessary behavior for use. The modulus of elasticity is determined as described in DIN 53.457. To determine the abrasion resistance, the method described in the ECE standard R-43 is used, by having two friction rollers with an abrasive effect act on the rotating sample for 100 revolutions, with a stress of 500 g. To evaluate the abrasion caused by this stress, the increase in cloudiness is then measured in comparison with the original cloudiness before treatment, indicated in %, also using the method described in the ECE standard R-43. The micro-sclerometric hardness is determined according to the Erichsen method, in which a test set-up is used as described in DIN 53.799, with the exception that the cone-shaped cutting diamond used has a cone angle of 50 degrees and a rounding radius of 15 micrometers at the cone tip. To evaluate the microsclerometric hardness, the highest load weight of the cutting diamond at which no permanently visible damage to the surface is evident yet is indicated.

From experience, it is known that self-healing transparent polyurethane cover layers can be used as shatter protection layers if the modulus of elasticity of these layers is between 2 and 20 N/mm$^2$, the increase in cloudiness due to abrasion is less than 4% according to ECE R-43, and the microsclerometric hardness according to Erichsen is above 10 p. Even hydrophilic cover layers are therefore only useful for practical continuous use if the properties stated lie within these limits.

To evaluate the wetability of the cover layer and thereby the condensation-inhibiting effect, the wetting angle of water drops applied to the surface of the cover layer is measured using a goniometer microscope. For the stated cover layers of soft elastic polyurethane which have no condensation-inhibiting effect, the size of the wetting angle is 70 to 80 degrees. For cover layers which do have a condensation-inhibiting effect, however, the size of the wetting angle is only a few degrees and can even be reduced to zero degrees.

In the following, several embodiments are described within the scope of the claimed compositions, and the mechanical and condensation-inhibiting properties measured for these cover layers in each case are reproduced; here, Example 1 concerns a cover layer not in accordance with the invention and merely serves for comparison.

In all embodiments, films are produced from the reaction mixtures, by pouring the reaction mixture, after homogenization, onto glass plates heated to about 60 degrees Celsius, in a layer thickness of 0.5 mm. The poured layer is allowed to cure for 30 minutes at a temperature of 90 degrees Celsius. Subsequently, the films are pulled away from the casting surface. The films are then conditioned for 48 hours at a temperature of 20 degrees Celsius and a relative humidity of 50%.

The mechanical properties, that is the modulus of elasticity, the increase in cloudiness due to abrasion and the microsclerometric hardness, are determined at room temperature.

The wetting angle as a measure of the wetting behavior is determined on two surfaces of the film in each case; the surface which was in contact with the glass surface is designated as Side A in the following, while the surface which was exposed to the surrounding air during the pouring and curing process is designated as Side B in the following examples The wetting angle is measured after three different pre-treatments of the film in some of the embodiments The first measurement (Measurement I) takes place after conditioning of the film, parallel to determination of the mechanical properties, at a temperature of 20 degrees Celsius. The second measurement (Measurement II) is carried out immediately after the first, at a temperature of +10 degrees Celsius. The third measurement (Measurement III) is also carried out at a temperature of +10 degrees Celsius, after the film has been placed in water at +10 degrees Celsius for 2 hours and subsequently dried for 16 hours at 20 degrees Celsius and 50% relative humidity. For those embodiments which only contain one value for wetting behavior, the measurement was taken after conditioning of the film, at a temperature of 20 degrees Celsius.

EXAMPLE 1 (COMPARISON EXAMPLE)

A cover layer is produced as described in the German patent application P 37 04 294. To produce the reaction mixture, 50 g of an essentially trifunctional polyisocyanate containing biuret groups, on the basis of 1,6-hexamethylene diisocyanate, with a content of free NCO groups of 23% by weight, corresponding to an average molecular weight of approximately 550 g/mol, 42.5 g of a trifunctional polyol on the basis of trimethylolpropane with an OH content of 11% by weight, corresponding to an average molecular weight of approximately 500 g/mol, as well as 8.5 g of a difunctional polyether-1,3-diol containing sulfonate groups, with a content of OH groups of 2.6% by weight, corresponding to an average molecular weight of approximately 1300 g/mol, with the formula stated initially, are used, in which

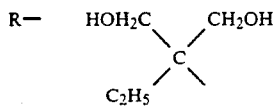

X=sodium ion,
n=20 and
m=3.

Furthermore, the reaction mixture contains 5 g of a non-ionic polyether polysiloxane (dimethyl siloxane-/monomethyl polyether siloxane copolymer) with the formula stated initially, with an average molecular weight of approximately 700 g/mol, where the ratio is $x/y = 1/1$,
a=100% by weight, and
b=0% by weight.

0.05 g dibutyl stannous dilaureate as a catalyst and 1.0 g of a sterically inhibited amine as protection against the effects of light are added to the polyol.

For the mechanical properties and the wetting behavior, the following values were measured:

| Mechanical properties: | |
|---|---|
| modulus of elasticity | 8.1 ± 0.2 N/mm² |
| increase in cloudiness due to abrasion | 3.1% |
| microsclerometric hardness | 28 p |

| Wetting behavior: | | | |
|---|---|---|---|
| | Measurement I | Measurement II | Measurement III |
| Side A | 0 degrees | 13 degrees | 40 degrees |
| Side B | 5 degrees | 20 degrees | 42 degrees |

It is obvious that the wetting behavior under the conditions under which Measurements II and III were carried out is not satisfactory.

EXAMPLE 1

To produce a cover layer according to the invention, a reaction mixture is used, to which a difunctional polyether polyol containing sulfonate groups, as well as a non-ionic polyether polysiloxane, as well as in addition, an ethoxylated fatty alcohol as a non-ionic tenside, are added.

For this purpose, 50 g of an essentially trifunctional polyisocyanate containing biuret groups, on the basis of 1,6hexamethylene diisocyanate, with a content of free NCO groups of 23% by weight, corresponding to an average molecular weight of approximately 550 g/mol, 25 g of a trifunctional polyol on the basis of trimethylolpropane with an OH content of 11% by weight, corresponding to an average molecular weight of approximately 500 g/mol, 8 g of a difunctional polyether-1,3-diol containing sulfonate groups, with a content of OH groups of 2.6% by weight, corresponding to an average molecular weight of approximately 1300 g/mol, with the formula stated initially, are used, in which

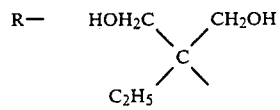

X=sodium ion,
n=20 and
m=3, 5 g of the dimethyl siloxane/monomethyl polyether siloxane copolymer stated in Example 1, as well as 8 g of an ethoxylated fatty alcohol with the formula stated initially, with an average molecular weight of approximately 350 g/mol, corresponding to a content of OH groups of 4.9%, where n=10 and m=4 in the chemical formula, are mixed together As additives, 0.05 g dibutyl stannous dilaureate as a catalyst and 1.0 g of a sterically inhibited amine as protection against the effects of light are added to the polyol.

For the mechanical properties and the wetting behavior of this film, the following values were measured:

| Mechanical properties: | |
|---|---|
| modulus of elasticity | 6.6 ± 0.4 N/mm² |
| increase in cloudiness due to abrasion | 2.6% |
| microsclerometric hardness | 26 p |

| Wetting behavior: | | | |
|---|---|---|---|
| | Measurement I | Measurement II | Measurement III |
| Side A | 0 degrees | 5 degrees | 5 degrees |
| Side B | 6 degrees | 8 degrees | 5 degrees |

The mechanical properties of this cover layer are therefore within the required limits. The wetting behavior at low temperatures, especially after water immersion, are significantly improved as compared with the comparison example.

example 3

A reaction mixture of the following components is produced:

50 g of an essentially trifunctional polyisocyanate containing biuret groups, on the basis of 1,6-hexamethylene diisocyanate, with a content of free NCO groups of 23% by weight, corresponding to an average molecular weight of approximately 550 g/mol;

29 g of a trifunctional polyol on the basis of trimethylolpropane with an OH content of 11% by weight, corresponding to an average molecular weight of approximately 500 g/mol;

6 g of a difunctional polyether-1,3-diol containing sulfonate groups, with a content of 0H groups of 2.6% by weight, corresponding to an average molecular weight of approximately 1300 g/mol;

5 g of the dimethyl siloxane/monomethyl polyether siloxane copolymer stated in Example 1;

12 g of an ethoxylated fatty alcohol with the formula stated initially, with a content of OH groups of 3.5% by weight, corresponding to an average molecular weight of approximately 480 g/mol, where n=13 and m=6 in the chemical formula.

As additives, 0.05 g dibutyl stannous dilaureate as a catalyst and 1.0 g of a sterically inhibited amine as protection against the effects of light are added to the polyol.

For a film produced from this reaction mixture, the following values for mechanical properties and the wetting behavior were measured:

| Mechanical properties: | | | |
|---|---|---|---|
| modulus of elasticity | 7.4 ± 0.4 N/mm² | | |
| increase in cloudiness due to abrasion | 3.1% | | |
| microsclerometric hardness | 26 p | | |
| Wetting behavior: | | | |
| | Measurement I | Measurement II | Measurement III |
| Side A | 0 degrees | 5 degrees | 5 degrees |
| Side B | 5 degrees | 9 degrees | 7 degrees |

The mechanical properties of this cover layer are within the required limits. The wetting behavior at low temperatures, and especially after water immersion, are clearly improved as compared with the comparison example.

EXAMPLE 4

A reaction mixture of the following components produced:

50 g of the trifunctional polyisocyanate stated for the preceding examples, with a content of free NCO groups of 23% by weight, corresponding to an average molecular weight of approximately 550 g/mol;

29 g of a trifunctional polyol on the basis of trimethylolpropane with an OH content of 11% by weight, corresponding to an average molecular weight of approximately 500 g/mol;

4 g of a difunctional polyether-1,3-diol containing sulfonate groups, with a content of OH groups of 2.6% by weight, corresponding to an average molecular weight of approximately 1300 g/mol, with the formula stated initially, where

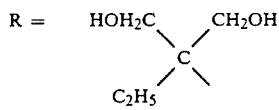

X = sodium ion,
n = 20 and
m = 3, 5 g of the dimethyl siloxane/monomethyl polyether siloxane copolymer stated in Example 1;

16 g of an ethoxylated fatty alcohol with the formula stated initially, with an average molecular weight of approximately 700 g/mol, corresponding to a content of OH groups of 2.4%, where n=16 and m=10 in the chemical formula.

As additives, 0.05 g dibutyl stannous dilaureate as a catalyst and 1.0 g of a sterically inhibited amine as protection against the effects of light are added to the polyol. For a film produced from this reaction mixture, the following values for mechanical properties and the wetting behavior are measured:

| Mechanical properties: | | | |
|---|---|---|---|
| modulus of elasticity | 4.5 ± 0.4 N/mm² | | |
| increase in cloudiness due to abrasion | 2.2% | | |
| microsclerometric hardness | 27 p | | |
| Wetting behavior: | | | |
| | Measurement I | Measurement II | Measurement III |
| Side A | 0 degrees | 5 degrees | 5 degrees |
| Side B | 5 degrees | 7 degrees | 5 degrees |

In this case again, the mechanical properties are within the required limits. The wetting behavior at low temperatures, and especially after water immersion, are clearly improved as compared with the comparison example.

EXAMPLE 5

The reaction mixture demonstrates the following composition:

50 g of the trifunctional polyisocyanate stated for the preceding examples, with a content of free NCO groups of 23% by weight, corresponding to an average molecular weight of approximately 550 g/mol;

20 g of a trifunctional polyol on the basis of trimethylolpropane with an OH content of 11% by weight, corresponding to an average molecular weight of approximately 500 g/mol;

5 g of a difunctional polyether-1,3-diol containing sulfonate groups mentioned in Example 4, with a content of OH groups of 2.6% by weight, corresponding to an average molecular weight of approximately 1300 g/mol;

5 g of the dimethyl siloxane/monomethyl polyether siloxane copolymer stated in Example 1;

15 g of an ethoxylated fatty amine with the formula stated initially, with an average molecular weight of approximately 520 g/mol, corresponding to a content of OH groups of 6 5% by weight, where n=10 and m=4 in the chemical formula.

As additives, 0.05 g dibutyl stannous dilaureate as a catalyst and 1.0 g of a sterically inhibited amine as protection against the effects of light are added to the polyol.

For a film produced from this reaction mixture, the following values for mechanical properties and the wetting behavior are measured:

| Mechanical properties: | | | |
|---|---|---|---|
| modulus of elasticity | 9.5 ± 0.8 N/mm² | | |
| increase in cloudiness due to abrasion | 2.7% | | |
| microsclerometric hardness | 33 p | | |
| Wetting behavior: | | | |
| | Measurement I | Measurement II | Measurement III |
| Side A | 0 degrees | 5 degrees | 6 degrees |
| Side B | 7 degrees | 10 degrees | 10 degrees |

This cover layer also demonstrates mechanical properties which are within the required limits. The wetting behavior at low temperatures, and especially after water immersion, is clearly improved as compared with the comparison example.

EXAMPLE 6

A reaction mixture of the following components is produced:

50 g of the trifunctional polyisocyanate described in the preceding examples;

28 g of the trifunctional polyol on the basis of trimethylolpropane described in the preceding examples;

6 g of the difunctional polyether-1,3-diol containing sulfonate groups stated in Example 4;

5 g of the dimethyl siloxane/monomethyl polyether siloxane copolymer stated in Example 1;

11 g of an ethoxylated fatty amine with the formula stated initially, with an average molecular weight of approximately 1000 g/mol, corresponding to a content of OH groups of 3.4% by weight, where n=13 and m=9.

As additives, 0.05 g dibutyl stannous dilaureate as a catalyst and 1.0 g of a sterically inhibited amine as protection against the effects of light are added to the polyol.

For a film produced from this reaction mixture, the following values for mechanical properties and the wetting behavior are measured:

| Mechanical properties: | |
|---|---|
| modulus of elasticity | 8.3 ± 0.3 N/mm$^2$ |
| increase in cloudiness due to abrasion | 1.8% |
| microsclerometric hardness | 25 p |

| | Wetting behavior: | | |
|---|---|---|---|
| | Measurement I | Measurement II | Measurement III |
| Side A | 0 degrees | 5 degrees | 7 degrees |
| Side B | 8 degrees | 10 degrees | 11 degrees |

This cover layer again demonstrates properties which are within the required limits in terms of mechanical properties and which are clearly better with regard to wetting behavior at low temperatures and after water immersion, as compared with the cover layer of the comparison example

EXAMPLE 7

A reaction mixture of the following components is produced:

50 g of the trifunctional polyisocyanate described in the preceding examples;

25 g of the trifunctional polyol on the basis of trimethylolpropane described in the preceding examples;

8 g of the difunctional polyether-1,3-diol containing sulfonate groups stated in Example 4;

5 g of the dimethyl siloxane/monomethyl polyether siloxane copolymer stated in Example 1;

20 g of an ethoxylated fatty amine with the formula stated initially, with an average molecular weight of approximately 1570 g/mol, corresponding to a content of OH groups of 2.2% by weight, where n=16 and m=15.

As additives, 0.05 g dibutyl stannous dilaureate as a catalyst and 1.0 g of a sterically inhibited amine as protection against the effects of light are added to the polyol.

For a film produced from this reaction mixture, the following values for mechanical properties and the wetting behavior are measured:

| Mechanical properties: | |
|---|---|
| modulus of elasticity | 6.3 ± 0.4 N/mm$^2$ |
| increase in cloudiness due to abrasion | 2.7% |
| microsclerometric hardness | 28 p |

| | Wetting behavior: | | |
|---|---|---|---|
| | Measurement I | Measurement II | Measurement III |
| Side A | 0 degrees | 6 degrees | 6 degrees |
| Side B | 4 degrees | 8 degrees | 7 degrees |

For this cover layer again, the wetting behavior at low temperatures and after water immersion are clearly better than for the cover layer of the comparison example, while the mechanical properties are also within the required limits.

EXAMPLE 8

A reaction mixture of the following components is produced:

36.11 g of the trifunctional polyisocyanate described in Example 3;

4.01 g of a difunctional isocyanate urea adduct on the basis of isophoron diisocyanate with a content of OH groups of 28% by weight, corresponding to an average molecular weight of 300 g/mol, 32.78 g of a polycaprolactone with a content of OH groups of 9.5% by weight, corresponding to an average molecular weight of 537 g/mol, 8.02 g of a difunctional polyester polyol with a content of OH groups of 3.3% by weight, corresponding to an average molecular weight of 1030 g/mol, 4.81 g of a difunctional polyester polyol containing sulfonate groups, with a content of OH groups of 2.6% by weight, corresponding to an average molecular weight of approximately 1300 g/mol;

10.03 g of an ethoxylated fatty alcohol with the formula stated initially, with a content of OH groups of 3.5% by weight, corresponding to an average molecular weight of approximately 480 g/mol, where n=13 and m=6, 3.81 g of the dimethyl siloxane/monomethyl polyether siloxane copolymer stated in Example 1;

0.019 g dibutyl stannous dilaureate, and 0.39 g of a sterically inhibited amine as protection against the effects of light.

For a film produced from this reaction mixture, the following values for mechanical properties and the wetting behavior are measured:

| Mechanical properties: | |
|---|---|
| modulus of elasticity | 6.2 N/mm$^2$ |
| increase in cloudiness due to abrasion | 2.12 % |
| microsclerometric hardness | 38 p |

| Wetting behavior: | |
|---|---|
| Side A | 0 degrees |
| Side B | 3 degrees |

For this cover layer again, the wetting behavior at low temperatures and after water immersion are clearly better than for the cover layer of the comparison example, while the mechanical properties are also within the required limits.

EXAMPLE 9

Of the components stated in Example 8, the following amounts are weighed out and the reaction mixture is produced from them:

40.83 g trifunctional polyisocyanate 10.21 g difunctional isocyanate urea adduct 21.84 g polycaprolactone 5.46 g difunctional polyester polyol
5.46 g difunctional polyether-1,3-diol containing sulfonate groups
10.92 g ethoxylated fatty alcohol
4.75 g dimethyl siloxane/monomethyl polyether siloxane copolymer
0.024 g dibutyl stannous dilaureate, and 0.50 g sterically inhibited amine.

The reaction mixture has a ration of NCO/OH of 1.8.

For a film produced from this reaction mixture, the following values for mechanical properties and the wetting behavior were measured:

| Mechanical properties: | |
|---|---|
| modulus of elasticity | 7.2 N/mm$^2$ |
| increase in cloudiness due to abrasion | 2.56% |
| microsclerometric hardness | 34 p |
| Wetting behavior: | |
| Side A | 0 degrees |
| Side B | 3 degrees |

EXAMPLE 10

Of the components stated in Example 8, the following amounts are weighed out and the reaction mixture is produced from them:

42.80 g trifunctional polyisocyanate
10.70 g difunctional isocyanate urea adduct
20.65 g polycaprolactone
5.16 g difunctional polyester polyol
5.14 g difunctional polyether-1,3-diol containing sulfonate groups
10.32 g ethoxylated fatty alcohol
4.71 g dimethyl siloxane/monomethyl polyether siloxane copolymer
0.024 g dibutyl stannous dilaureate, and 0.50 g sterically inhibited amine.

The reaction mixture has a ration of NCO/OH of 2.0.

For a film produced from this reaction mixture, the following values for mechanical properties and the wetting behavior were measured:

| Mechanical properties: | |
|---|---|
| modulus of elasticity | 7.4 N/mm$^2$ |
| increase in cloudiness due to abrasion | 3.74% |
| microsclerometric hardness | 33 p |
| Wetting behavior: | |
| Side A | 0 degrees |
| Side B | 4 degrees |

EXAMPLE 11

Of the components stated in Example 8, the following amounts are weighed out and the reaction mixture is produced from them:

39.57 g trifunctional polyisocyanate
18.71 g difunctional isocyanate urea adduct
18.68 g polycaprolactone
2.83 g difunctional polyester polyol
4.97 g difunctional polyether-1,3-diol containing sulfonate groups
9.89 g ethoxylated fatty alcohol
4.81 g dimethyl siloxane/monomethyl polyether siloxane copolymer
0.025 g dibutyl stannous dilaureate, and 0.50 g sterically inhibited amine The reaction mixture has a ration of NCO/OH of 2.5.

For a film produced from this reaction mixture, the following values for mechanical properties and the wetting behavior were measured:

| Mechanical properties: | |
|---|---|
| modulus of elasticity | 13.6 N/mm$^2$ |
| increase in cloudiness due to abrasion | 3.90% |
| microsclerometric hardness | 30 p |
| Wetting behavior: | |
| Side A | 0 degrees |
| Side B | 24 degrees |

Obviously, numerous modifications and variations of the present invention are possible in light of the above teachings. It is therefore to be understood that within the scope of the appended claims, the invention may be practiced otherwise than as specifically described herein.

We claim:

1. A transparent cover layer for viewing windows or other transparent glass or plastic substrates, with a condensation-inhibiting effect made of soft elastic polyurethane made by polymerization of a reaction mixture comprising the following components:

(a) a trifunctional aliphatic polyisocyanate of 1,6-hexamethylene diisocyanate with a biuret or isocyanurate structure with a content of NCO groups of 12.6 to 28% by weight, corresponding to an average molecular weight of approximately 1000 to approximately 450 g/mol;

(b) a trifunctional polyol selected from the group consisting of (A) a composition of trimethylolpropane and propylene oxide with a content of OH groups of 5.1 to 12.8% by weight, corresponding to an average molecular weight of approximately 1000 to approximately 400 g/mol, (B) a trifunctional polycaprolactone with a content of OH groups of 5.1 to 17% by weight, corresponding to an average molecular weight of 1000 to 300 g/mol and mixtures of A and B;

(c) a difunctional sulfonated polyoxyalkylene ether, of 1,2- or 1,3-diolene with a content of OH groups of 0.5 to 13.2% by weight, corresponding to an average molecular weight of approximately 6500 to 250 g/mol, with the formula $$R-CH_2O-(C_2H_4O-)_n-(C_3H_6O-)-m-CH_2CH_2CH_2-SO_3X$$

where

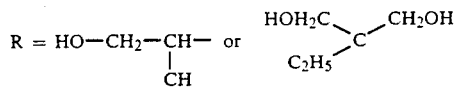

X=H—, sodium or ammonium ion,
n'0 to 1-00,
m=0 to 30, (d) non-ionic copolymer of dimethyl polysiloxane (dimethyl siloxane/monoethyl polyether siloxane copolymer) modified with polyoxyalkylene in the side chain, with an average molecular weight of approximately 500-2000 g/mol, with the general formula

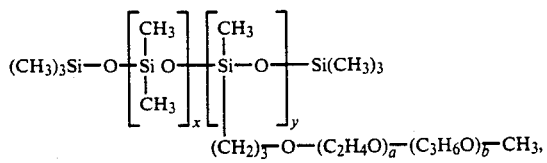

where the ratio x/y = 5/1 to 1/1,
a = 80–100% by weight, and
b = 20–0% by weight, and (e) at least one non-ionic tenside selected from the group consisting of (A) an ethoxylated fatty alcohol, (B) an ethoxylated fatty amine and mixtures of A and B.

2. A transparent cover layer according to claim 1, wherein the reaction mixture additionally contains 4.0 to 18.7% by weight of a difunctional isocyanate urea adduct prepared from isophorondiisocyanate and urea with a content of NCO groups of 23 to 29% by weight, corresponding to an average molecular weight of 365 to 290 g/mol.

3. A transparent cover layer according to claim 1 wherein the reaction mixture additionally contains 2.8 to 8.0% by weight of a difunctional polyester polyol with a content of OH groups of 2 to 5% by weight, corresponding to an average molecular weight of 1700 to 680 g/mol.

4. A transparent cover layer according to claim 1 wherein the ratio of NCO groups to OH groups in the reaction mixture is 1.0 to 2.5.

5. A transparent cover layer according to claim 1, wherein a non-ionic tenside in the form of compound of the formula below with a content of OH groups of 2.4 to 4.9% by weight, corresponding to an average molecular weight of 700 to 350 g/mol, with the formula $$CH_3-(CH_2)_n-O-(C_2H_4O)_m-H$$

is used, where
n = 10 to 16 and m = 4 to 10.

6. A transparent cover layer according to claim 5, wherein the proportion of said non-ionic tenside in the reaction mixture is 8.3 to 15.5% by weight.

7. A transparent cover layer according to claim 1 characterized by the fact that a non-ionic tenside in the form of an ethoxylated fatty amine with a content of OH groups of 2.2 to 6.5% by weight, corresponding to an average molecular weight of 1600 to 520 g/mol, with the formula

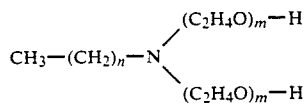

is used, where
n = 10 to 16 and m = 4 to 15.

8. A transparent cover layer according to claim 7, wherein the proportion of the ethoxylated fatty amine in the reaction mixture is 11.0 to 18.5% by weight.

* * * * *